US012239592B2

(12) United States Patent
Grou et al.

(10) Patent No.: US 12,239,592 B2
(45) Date of Patent: Mar. 4, 2025

(54) PATIENT TRANSFER MATTRESS

(71) Applicant: Mölnlycke Health Care AB, Gothenburg (SE)

(72) Inventors: Anna Grou, Gothenburg (SE); Patrick Rodzewicz, Gothenburg (SE); Conny Jakobsson, Lerum (SE); Daniel Melin, Mölnlycke (SE)

(73) Assignee: Mölnlycke Health Care AB, Mölndal (SE)

( * ) Notice: Subject to any disclaimer, the term of this patent is extended or adjusted under 35 U.S.C. 154(b) by 225 days.

(21) Appl. No.: 17/781,183

(22) PCT Filed: Dec. 9, 2020

(86) PCT No.: PCT/EP2020/085292
§ 371 (c)(1),
(2) Date: May 31, 2022

(87) PCT Pub. No.: WO2021/122226
PCT Pub. Date: Jun. 24, 2021

(65) Prior Publication Data
US 2023/0000704 A1 Jan. 5, 2023

(30) Foreign Application Priority Data
Dec. 16, 2019 (EP) .................................... 19216675

(51) Int. Cl.
*A61G 7/10* (2006.01)

(52) U.S. Cl.
CPC ......... *A61G 7/1028* (2013.01); *A61G 7/1021* (2013.01); *A61G 7/1026* (2013.01); *A61G 2200/32* (2013.01)

(58) Field of Classification Search
None
See application file for complete search history.

(56) References Cited

U.S. PATENT DOCUMENTS

| | | | | |
|---|---|---|---|---|
| 7,464,422 | B2 * | 12/2008 | Townsend | A61G 7/001 5/710 |
| 8,566,977 | B2 | 10/2013 | Davis | |
| 10,034,808 | B2 | 7/2018 | Vrzalik et al. | |
| 10,039,680 | B2 * | 8/2018 | Galbraith | A61G 7/1055 |
| 2005/0283907 | A1 | 12/2005 | Dalton | |
| 2012/0210511 | A1 | 8/2012 | Davis | |

(Continued)

FOREIGN PATENT DOCUMENTS

| | | |
|---|---|---|
| GB | 2402075 | 7/2003 |
| NL | 8301772 | 12/1984 |

(Continued)

OTHER PUBLICATIONS

Peterson et al. "*Pressure ulcer risk of patient handling sling use*" (JRRD, vol. 52, No. 3, 2015, pp. 291-300.

(Continued)

*Primary Examiner* — Adam C Ortiz
(74) *Attorney, Agent, or Firm* — Ballard Spahr LLP

(57) ABSTRACT

Described is a patient transfer mattress for lifting and transferring patients. The patient transfer mattress can be used in a gentle and pressure ulcer preventative approach. Also described is a method for lifting and/or transferring a patient using a patient transfer mattress.

16 Claims, 8 Drawing Sheets

(56) References Cited

U.S. PATENT DOCUMENTS

| | | | | |
|---|---|---|---|---|
| 2018/0028381 | A1 | 2/2018 | Purdy et al. | |
| 2018/0228306 | A1* | 8/2018 | May | A47G 9/1027 |
| 2018/0303690 | A1* | 10/2018 | Hahn | A61G 7/05715 |
| 2018/0311097 | A1* | 11/2018 | Rodzewicz | A61G 7/1023 |

FOREIGN PATENT DOCUMENTS

| | | | | |
|---|---|---|---|---|
| WO | WO-9942069 A1 * | 8/1999 | | A47C 4/54 |
| WO | WO 2019/224798 | 11/2019 | | |

OTHER PUBLICATIONS

International Search Report and Written Opinion were mailed on Feb. 17, 2021 by the International Searching Authority for International Application No. PCT/EP2020/085292 filed on Dec. 19, 2020 and published as WO 2021/122226A1 (Applicant—Molnlycke Health Care AB) (12 pages).

* cited by examiner

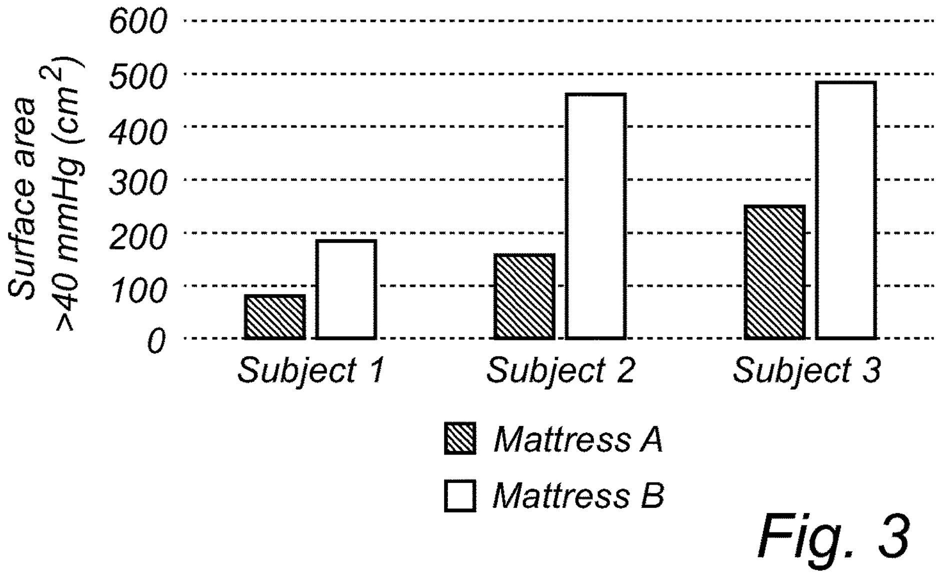
Fig. 3
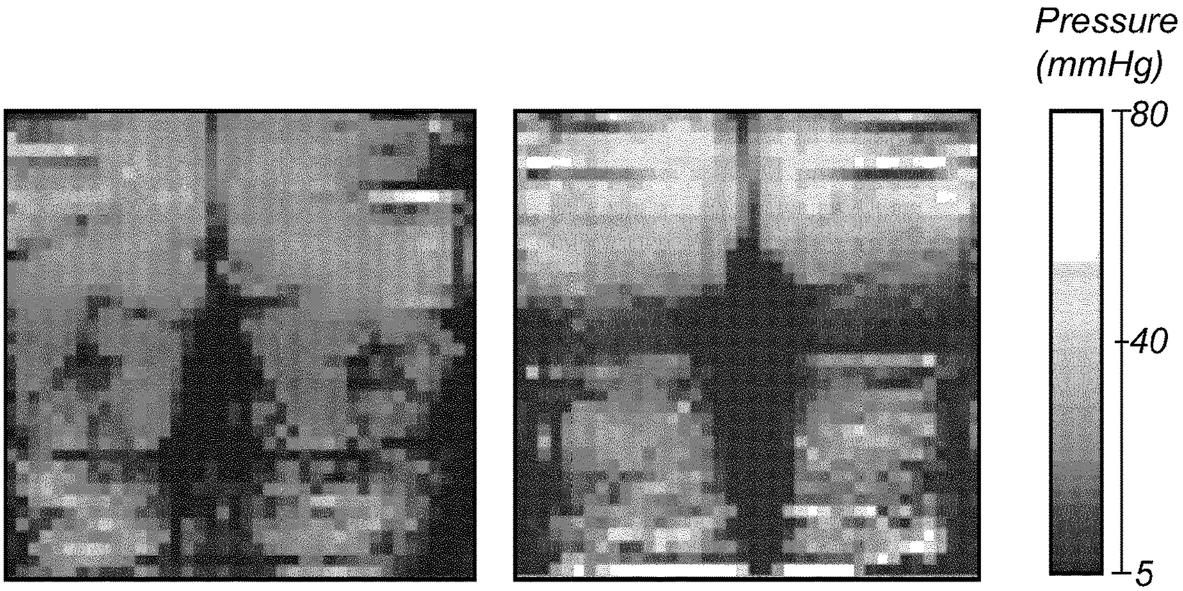
Fig. 4A
Fig. 4B

PATIENT TRANSFER MATTRESS

CROSS-REFERENCE TO RELATED APPLICATIONS

This application is a U.S. National Phase Application of International Application No. PCT/EP2020/085292, filed Dec. 9, 2020, which claims priority to European Application No. 19216675.9, filed Dec. 16, 2019, each of which are hereby incorporated by reference in their entirety.

TECHNICAL FIELD

The present disclosure generally relates to a patient transfer mattress for lifting and transferring patients by means of a gentle and pressure ulcer preventative approach. The present disclosure also relates to a method for lifting and/or transferring a patient, and to a method for repositioning a patient.

BACKGROUND

Immobilized patients in hospital or elderly care facilities must regularly be moved from one location to another, e.g. from a hospital bed to a wheelchair or from one bed to another bed or support surface. Caregivers may devote significant time and effort in lifting patients for the purpose of turning and repositioning, changing bed linens and taking care of the hygiene of the patients.

For patients being bedridden or immobile, caregivers typically require the aid of lifting systems, such as ceiling- or floor-based lifts, during transfer and transport.

One technique commonly used is to move or reposition a patient by means of a sling sheet and a lift. The sling sheet is placed underneath the patient, and then engaged with a lifting device that uses a hoist to lift a patient off a bed, after which the patient can be moved, repositioned or transferred to another bed. This movement can be a strenuous practice for caregivers, particularly where the patient is heavy relative to the caregiver.

Patients being bedridden are prone to developing pressure ulcers. The skin of such patients, particularly of elderly patients is fragile, and susceptible to shear forces and tearing of the skin, which may arise during sliding or movement of the patient. Gentle care and handling of this patient group is therefore critical.

Various types of support mattresses exist on the market, which aim to prevent the formation of pressure ulcers. Such mattresses may comprise a gel, a foam or air to redistribute pressure under the body.

Air-filled mattresses may be inflatable; i.e. comprising air-filled sacs that inflate and deflate alternatingly, as disclosed in reference U.S. Pat. No. 8,566,977 and U.S. Ser. No. 10/034,808 or may be pre-inflated with air as disclosed in e.g. US2018/0028381.

Furthermore, various types of patient handling sling sheets exist to enable the transfer of a patient from one surface to another by means of a lift to which the sling sheet is attached.

While many patient support mattresses aim at protecting a patient from developing pressure ulcers when a patient is in a lying position, most sling sheets are designed to reduce the burden for caregivers; i.e. to prevent caregivers from becoming injured during lifting.

Transferring individuals with patient handling slings exposes them to high interface pressures. This problem is tackled in "*Pressure ulcer risk of patient handling sling use*" (JRRD, Volume 52, No 3, 2015, pages 291-300, Peterson et al). The article addresses the need for a more gentle approach for the purpose of lifting and transferring patients due to the risk of pressure ulcer formation. Furthermore, this article specifies that the interface pressure is elevated along the edges of a sling sheet; i.e. the sling seams, and that the anatomical areas exposed to the highest pressure during lifting are the lower thighs towards the groin and the knees, respectively.

Even though the high pressure areas that occur during lifting are not "typical" areas for the formation of pressure ulcers, the exposure to pressure at these areas may be harmful to the skin, particularly with elderly patients with a fragile skin or with patients having been bed-ridden during longer periods of time. Apart from elevated interface pressures, shear forces may arise during lifting and transferring a patient. Such shear forces may deform the underlying tissue and result in the formation of pressure ulcers. Furthermore, friction forces caused by sharp edges of a sling sheet in the area of the lower thighs may result in tearing of the skin, often referred to as "skin tears".

In view of the above, there is a need for an improved patient transfer device that reduces the occurrence of pressure points and that protects the skin, and the underlying tissue of a patient during lifting. Furthermore, there is a need to provide for a proactive and simple means to minimize the burden for caregivers and staff dealing with lifting and transferring patients in a medical or care facility.

SUMMARY

In view of the above mentioned and other drawbacks of the prior art, it is an object of the present disclosure to provide improvements with respect to patient lifting and transfer mattresses, particularly with respect to preventing the occurrence of pressure ulcers.

According to a first aspect of the present disclosure, there is provided a patient transfer mattress having a lateral (x) and a longitudinal (y) extension, wherein the mattress can be arranged in a resting configuration and in a lifting configuration; the mattress comprising a main mattress section and a bottom mattress section, wherein the bottom mattress section has a smaller lateral (x) extension than the main mattress section, wherein the main mattress section comprises a first set of lifting straps arranged along a first lateral edge of the main mattress section and a second set of lifting straps arranged opposite of the first set of lifting straps along a second lateral edge of the main mattress section, wherein the bottom mattress section comprises at least one first lower lifting strap arranged on a first lateral edge of the bottom mattress section opposite of at least one second lower lifting strap arranged on a second lateral edge of the bottom mattress section; the lifting straps being configured to be connected to a patient lifting device, wherein the bottom mattress section comprises a sealed compartment of air and is configured to cover the thighs of a patient in the lifting configuration.

The mattress of the present invention allows for a more gentle and safe means for lifting and transferring patients. Although the duration of a lift of a patient is relatively short, this can have a significant impact on the formation of pressure ulcers and the formation of skin tears, particularly if the patient's skin is fragile, which is often the case when a patient has been bedridden during longer (and shorter) periods of time.

Pressure and shear forces resulting from the tension of the lifting straps during lifting may be particularly harmful to the lower thighs and the folds of the knees of the patient. This particular area is exposed to high amounts of pressure, particularly when a patient is lifted in a seated position.

When a patient is lifted, the provision of a sealed air compartment configured to cover the thighs of the patient results in a gentle "air cradle" around the thighs and just above the folds of the knees of a patient. A bolstering effect is thereby achieved on both the lower thighs and the folds of the knees as well as on the sides thereof. The provision of a sealed compartment of air provides a pressure offloading and pressure redistribution effect, and the risk of developing pressure ulcers during lifting is thereby reduced.

The size of the sealed air compartment may correspond to at least 80%, preferably at least 90% of the size of the bottom mattress section.

In other words, the sealed air compartment occupies substantially the entire bottom mattress section. This is to ensure that the regions at risk of developing pressure ulcers during lifting (i.e. the lower thighs and just above the knee folds of a patient) are efficiently offloaded and subject to less pressure points during lifting.

In embodiments, the air filling degree of the sealed air compartment is from 20 to 70%, preferably from 30 to 60%.

The sealed air compartment is typically preinflated with air to an air filling degree of from 20 to 70%, preferably from 30 to 60%. In other words, the bottom mattress section of the mattress of the present disclosure does not provide significant elevation of the thighs, but mainly serves to offload and redistribute the pressure in this region.

In the lifting configuration of the mattress of the present disclosure, the bottom mattress section may be folded such that the sealed compartment of air forms at least two overlying air compartments.

This is beneficial in various ways. First, the folded configuration of the sealed air compartment allows for the bottom mattress section to be adjusted and thereby correctly positioned just above the knee folds and covering the thighs of the patient.

Furthermore, the folded configuration of the sealed air compartment yields two overlying air compartments resulting in an improved pressure offloading and pressure redistribution effect. The "cradle" enclosing the thighs of the patient provides for an improved bolstering effect on both the lower thighs and the folds of the knees as well as on the sides thereof.

The inventors have found that the interface pressure at the lower thighs towards the folds of the knees is significantly reduced with a mattress according to the present disclosure. The formation of pressure ulcers is thereby prevented.

Due to the comfort and pressure re-distributing properties, the patient transfer mattress of the present disclosure could also constitute an alternative position in a patient turning schedule. Such turning and repositioning schedules are typically used in a care facility to aim in reducing the occurrence of pressure ulcers.

In embodiments, each of the lower lifting straps comprises at least a first and a second attachment means configured to attach the lifting straps to the bottom mattress section.

In other words, the lifting straps of the bottom mattress section may comprise two attachment means; i.e. two points of attachment on each side of the bottom mattress section. This way, folding of the bottom mattress section is facilitated.

The attachment means may be arranged at a distance, d1, from each other, wherein the distance, d1, corresponds to the minimum length by which the bottom mattress section is folded in the lifting configuration.

During lifting, the lifting straps are stretched, which forces the air in the overlying air compartments of the sealed air compartment of the bottom mattress section to be "trapped" or enclosed underneath the knee folds and lower thighs of the patient. An improved bolstering effect is thus achieved, right beneath the thighs and knees, but also on the sides thereof.

Depending on the length of the patient being lifted, the length of the folded bottom mattress section may be adjusted. The caregivers may adjust the length of the fold depending on the length of the patient. However, the lowermost edge of the folded bottom mattress section should preferably be positioned just above the folds of the knees of the patient.

In embodiments, the lower lifting straps are arranged at a distance, d2, from the interface between the main mattress section and the bottom mattress section, wherein the distance, d2, is larger than the distance d1.

In other words, the lower lifting straps are arranged at a lower portion of the bottom mattress section, close to the lower edge of the bottom mattress section. This allows for the caregivers to adjust the length of the fold depending on the length of the patient. During lifting, typically only a part of the bottom mattress section is folded (not the entire bottom mattress). This is beneficial to obtain a relatively large bolstering area covering the lower thighs and the area just above the folds of the knees. The cushioning provided at the lower thighs also has a bolstering effect on the upper thighs. This cushioning effect helps to redistribute the pressure and to reduce the pressure on the sacrum, which is typically an area of risk for developing pressure ulcers.

In embodiments, the first and second sets of lifting straps comprise at least three lifting straps.

This is to achieve an even distribution of load during lifting.

Preferably, the lifting straps of the main mattress section are arranged such that the distance, d3, between a first lifting strap and a neighbouring lifting strap is from 8 to 20 cm, preferably from 10 to 16 cm.

The distance between the lifting straps, d3, preferably does not exceed 20 cm. Otherwise, the patient body may be positioned unevenly on the mattress. For example, an overweight patient may have "protruding" body parts, such as the hips. When such a patient is lifted, there is a risk that he or she is positioned incorrectly, and thus also lifted incorrectly, resulting in an increased number of pressure points. The distance between the lifting straps should therefore be relatively short to eliminate this risk.

In order to further avoid this problem (incorrect positioning with e.g. an overweight patient) and to improve the distribution of load during lifting, each of the lifting straps of the first and said second sets of lifting straps comprises at least two attachment means. To optimize the load distribution and avoid harmful pressure points during lifting, the distance, d4, between each attachment means of the lifting straps of the main mattress section is substantially equal along the length of the lateral edges of the main mattress section, preferably wherein the distance, d4 is from 8 to 16 cm, e.g. from 10 to 14 cm.

To enhance the patient comfort during lifting, the mattress may comprise two side mattress sections; each side mattress section extending from each lateral edge of the main mattress section.

The side mattress sections serve to "enclose" the patient in a cradle during lifting.

In embodiments, the main mattress section has a first longitudinal edge and a second longitudinal edge; the bottom mattress section extending from the second longitudinal edge, and wherein the mattress comprises a head mattress section extending from the first longitudinal edge of the main mattress section.

This is to support the head and to increase the comfortability of the head during lifting.

In embodiments, the main mattress section comprises a first sealed compartment of air and the sealed compartment of air of the bottom mattress section is a second sealed compartment of air; the first and the second sealed compartments of air being configured to overlap in an area of the main mattress section.

Typically, the air compartments overlap in area of the lower portion of the main mattress section. This area corresponds to the area below where the sacrum of the patient is to be positioned. The sacrum region is an area exposed to a lot of pressure and shear, and an area of particular risk for developing pressure ulcers. The provision of overlapping air compartments at the lower portion of the main mattress allows for an improved offloading of the sacrum area, both in the resting configuration, as well as in the lifting configuration.

In embodiments, the first compartment of air and the second compartment of air are unattached to each other.

During lifting, the product is folded as a "taco shell", and the fact that the air compartments are unattached, yet overlapping allows the air to move freely and to adapt to the patient's body yielding a more conformable transfer device. If the bladders would have been attached to each other, tensions could form between the air compartments which could impair the conformability and result in an impaired offloading of the sacrum region.

In embodiments, the mattress comprises a top layer and a bottom layer, wherein the first compartment of air is attached to the top layer and the second compartment of air is attached to the bottom layer.

The first compartment of air may first be attached to the top layer of the mattress, and the second compartment of air may be attached to the bottom layer. Thereafter, the top layer and the bottom layer may be attached to each other, e.g. by sewing or sealing the outermost edges of the mattress.

This allows for the first and second air compartments to overlap, yet remain unattached such that air can more freely move within the compartments and better conform to the patient body.

According to another aspect, there is provided a method for lifting and/or transferring a patient comprising:

a) providing a patient transfer mattress having a lateral (x) and a longitudinal (y) extension and comprising a main mattress section, a bottom mattress section comprising a sealed compartment of air; the bottom mattress section having a smaller lateral (x) extension than the main mattress section, wherein the main mattress section comprises a first set of lifting straps arranged along a first lateral edge of the main mattress section and a second set of lifting straps arranged opposite of the first set of lifting straps along a second lateral edge of the main mattress section, wherein the bottom mattress section comprises a sealed compartment of air and;
b) positioning a patient on the patient transfer mattress such that the sealed compartment of air of the bottom mattress section is arranged to cover the thighs of the patient,
c) connecting the lifting straps to a patient lift system
d) lifting and/or transferring the patient.

In embodiments, the method comprises folding the bottom section such that the sealed compartment of air forms at least two overlying air compartments prior to connecting the lifting straps to a patient lift system. The bottom mattress section may be folded along a folding line which substantially corresponds to the lower thighs and/or the folds of the knees of a patient.

According to another aspect, there is provided a method for repositioning a patient comprising at least one step of lifting a patient with a mattress as described herein or comprising a method for lifting a patient as described hereinabove.

Further features of, and advantages with, the present disclosure will become apparent when studying the appended claims and the following description. The skilled addressee realizes that different features of the present disclosure may be combined to create embodiments other than those described in the following, without departing from the scope of the present disclosure.

BRIEF DESCRIPTION OF THE DRAWINGS

The various aspects of the present disclosure, including its particular features and advantages, will be readily understood from the following detailed description and the accompanying drawings, in which:

FIG. 3 illustrates the surface area for pressures above 40 mm Hg for a mattress according to the present disclosure (Mattress A) compared a mattress comprising no air (Mattress B).

FIG. 4 illustrates the pressure mat recordings for one test subject when lifted with a mattress according to the present disclosure (FIG. 4*a*) and a comparative mattress; i.e. Mattress B (FIG. 4*b*).

DETAILED DESCRIPTION

Figure 1A:
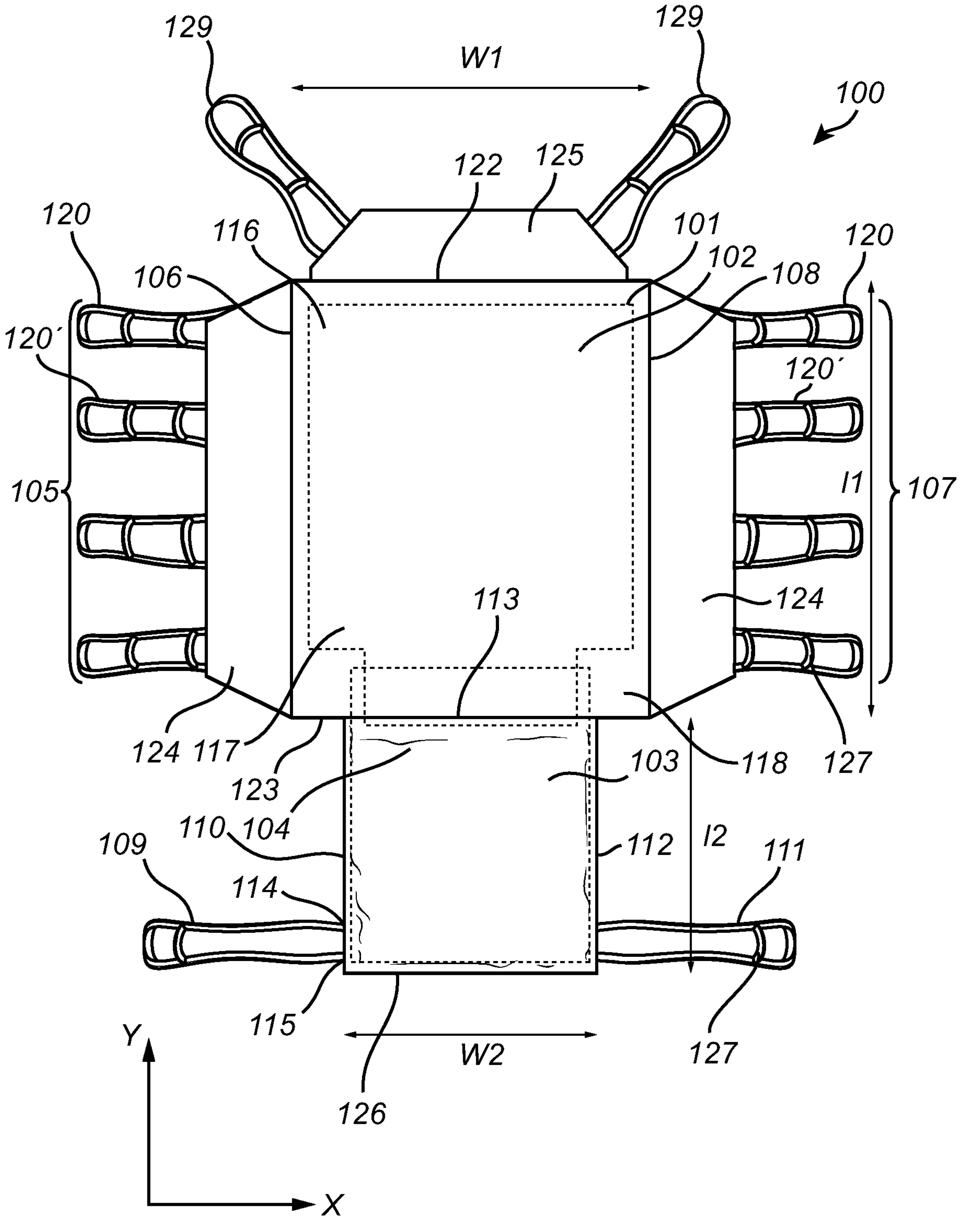
FIG. 1*a* illustrates a patient transfer mattress according to one embodiment of the present disclosure, seen from the top of the mattress.

The present invention will now be described more fully hereinafter with reference to the accompanying drawings, in which currently preferred embodiments of the present invention are shown. The present invention may, however, be embodied in many different forms and should not be construed as limited to the embodiments set forth herein; rather, these embodiments are provided for thoroughness and completeness, and fully convey the scope of the present invention to the skilled person.

FIG. 1 illustrates a patient transfer mattress 100 having a lateral (x) and a longitudinal (y) extension, wherein the mattress 100 can be arranged in a resting configuration and in a lifting configuration; the mattress 100 comprising a main mattress section 101 and a bottom mattress section 103; the bottom mattress section 103 having a smaller lateral (x) extension than the main mattress section 101, wherein the main mattress section 101 comprises a first set of lifting straps 105 arranged along a first lateral edge 106 of the main mattress section 101 and a second set of lifting straps 107 arranged opposite of the first set of lifting straps 105 along a second lateral edge 108 of the main mattress section 101, wherein the bottom mattress section 103 comprises at least one first lower lifting strap 109 arranged on a first lateral edge 110 of the bottom mattress section 103 opposite of at least one second lower lifting strap 111 arranged on a second lateral edge 112 of the bottom mattress section 103; the lifting straps (105, 107, 109, 111) being configured to be connected to a patient lifting device, wherein the bottom mattress section 103 comprises a sealed compartment of air 104 and is configured to cover the thighs of a patient in the lifting configuration.

As used herein, the term "patient transfer mattress" refers to a support mattress or an overlay designed to be placed directly on top of an existing surface, such as a bed. The patient transfer mattress may be used to offload pressure both during lifting of a patient (in the lifting configuration) and when the patient is lying down (in the resting configuration).

As used herein, the term "sealed compartment of air" means a compartment pre-inflated with air. The material of the compartment enclosing the air may be any kind of air leakage tight material.

As illustrated in FIG. 1*a*, the main mattress section may comprise a sealed compartment of air 102. This compartment of air may be referred to as a first sealed air compartment, and the sealed air compartment of the bottom mattress section 103 may be referred to as a second sealed compartment of air 104. The sealed compartments of air 102 and 104 are illustrated with dotted lines in FIG. 1*a*.

The pre-inflated mattress has various advantages compared to inflatable mattresses existing on the market. The fact that the mattress is pre-inflated relieves the burden for caregivers to deal with an additional step of inflating or deflating the mattress during lifting.

The size of the second sealed air compartment 104 may correspond to at least 80%, preferably at least 90% of the size of the bottom mattress section 103.

In other words, substantially the entire bottom mattress section 103 encloses an air compartment, and allows for an improved bolstering and cushioning effect during lifting.

The air filling degree of the sealed air compartment 104 may be from 20 to 70%, preferably from 30 to 60%.

Preferably, the mattress does not provide significant elevation of the thighs, but should be allowed to provide cushioning and allowing air to reposition and flow "freely" within the sealed air compartment 104.

As used herein, the term "resting configuration" means the configuration wherein the mattress lays substantially flat on a support surface. In this configuration, the bottom mattress section may or may not be arranged to cover the thighs of the patient. For example, if the patient has been positioned on the bed during a long period, it may be beneficial to fold the bottom mattress section in an area above the thighs, preferably under the sacrum of the patient to provide offloading and re-distribution of pressure in this area instead.

As used herein, the term "lifting configuration" means the configuration wherein the mattress is adapted to be lifted and attached to a lifting device. In this configuration, the bottom mattress section is arranged to cover the thighs of a patient to be lifted. The mattress should not exceed the folds of the knees, as this may result in that the folds of the knees may be bent in the wrong direction.

Figure 2A:
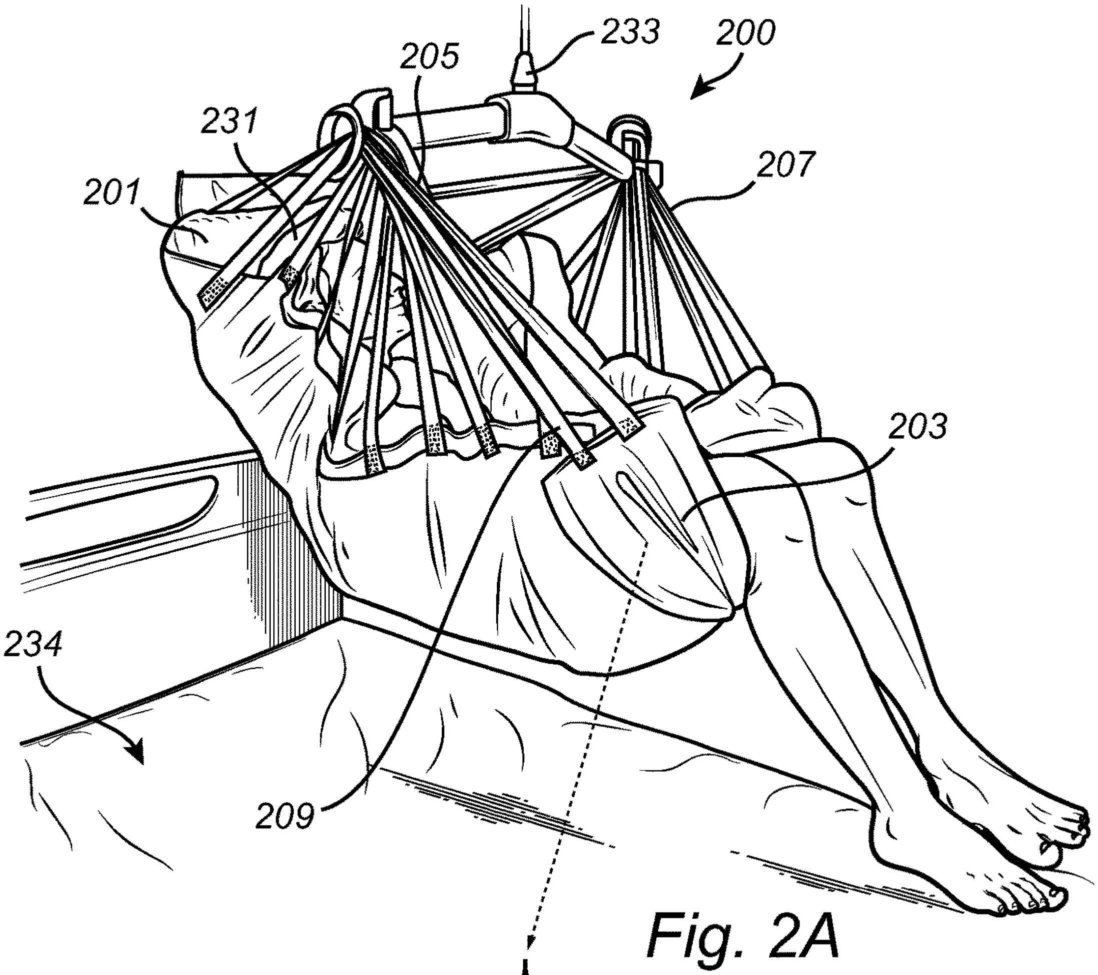
FIG. 2*a* illustrates a patient being lifted in the patient transfer mattress according to one embodiment of the present disclosure.
Figure 2B:
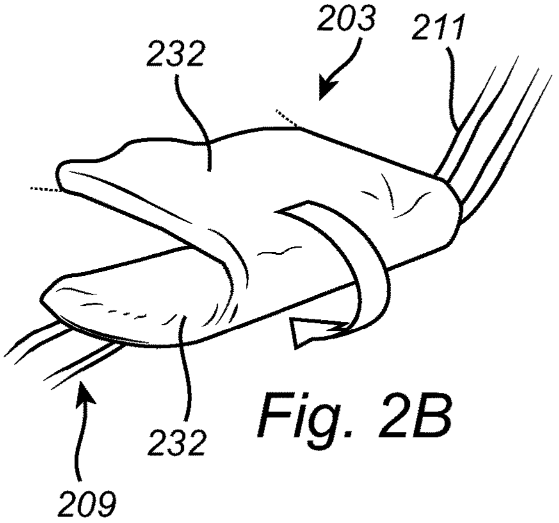
FIG. 2*b* is a partial, zoomed-in view of the folding of the bottom mattress section in the lifting configuration.
Figure 2C:
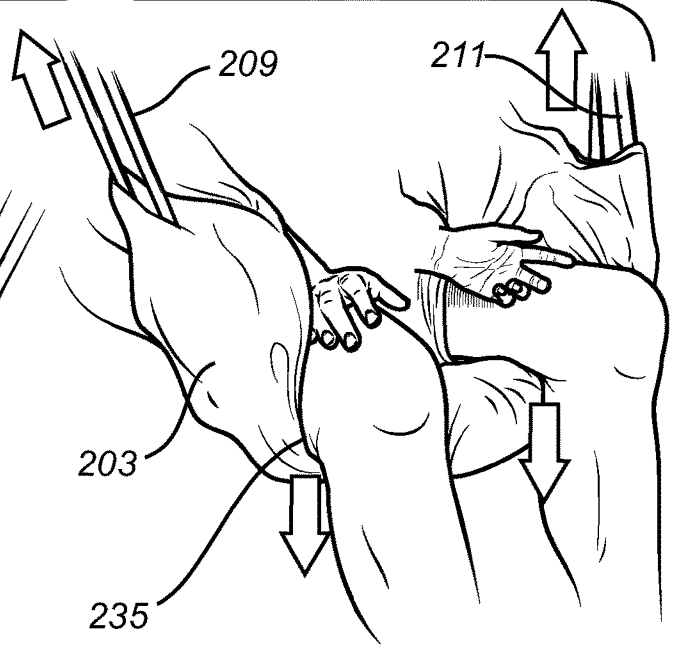
FIG. 2*c* is a zoomed-in view of the bolstering effect provided by the folding of the bottom mattress section.

In the lifting configuration, the bottom mattress section 103 may be folded such that the second sealed compartment of air 104 forms at least two overlying air compartments (as best illustrated in FIGS. 2*b* and 2*c*).

The main mattress section 101 is generally rectangular in shape and is adapted to cover at least the sacrum, pelvis and spine of a patient. The main mattress section 103 is defined by two opposing lateral edges 106 and 108 extending between opposing longitudinal edges 122 and 123. The lower longitudinal edge 123 corresponds to the interface 113 between the main mattress section 101 and the bottom mattress section 103.

The lateral (x) extension of the main mattress section; i.e. the width, w1, of the main mattress may be from 70 to 110 cm, e.g. from 80 to 100 cm.

The longitudinal (y) extension of the main mattress section; i.e. the length, 11, of the main mattress section may be from 100 to 130 cm, e.g. from 105 to 120 cm.

The bottom mattress section 103 is generally rectangular or square shaped and is adapted to cover the thighs and the folds of the knees of a patient. The bottom mattress section 103 is defined by two lateral edges 110 and 112 extending between opposing longitudinal edges 126 and 123. The lowermost longitudinal edge 126 also constitutes the peripheral edge of the mattress 100. The upper longitudinal edge corresponds to the lower longitudinal edge 123 of the main mattress section.

The lateral (x) extension of the bottom mattress section; i.e. the width, w2 of the bottom mattress section may be from 60 to 100, e.g. from 75 to 90 cm.

The longitudinal (y) extension of the bottom mattress section; i.e. the length, 12, of the bottom mattress section may be from 25 cm to 60 cm, e.g. from 30 to 45 cm.

The main mattress section 101 and the bottom mattress section 103 may either be formed from the same material or from different materials.

The bottom mattress section 103 comprises at least one first lower lifting strap 109 arranged on the first lateral edge 110 of the bottom mattress section 103 opposite of at least one second lower lifting strap 111 arranged on the second lateral edge 112 of the bottom mattress section 103.

Each of the lower lifting straps 109, 111 may comprise at least a first 114 and a second 115 attachment means configured to attach the lifting straps to the bottom mattress section 103.

As used herein "attachment means" refers to the means or points of attachment of the lifting straps 109, 111 to the bottom mattress section 103 (or, in embodiments, to the main mattress section 101). The attachment means may be secured to the bottom mattress by any mode of attachment, e.g. stitching, welding etc.

The lifting straps are typically arranged at the bottom part of the bottom mattress section 103; i.e. close to the peripheral edge 126 of the bottom mattress section 103 (i.e. the lowermost peripheral edge of the mattress 100).

The attachment means 114, 115 may be arranged at a distance, d1, from each other, wherein the distance, d1, corresponds to the minimum length by which the bottom mattress section 103 is folded in the lifting configuration.

The distance, d1, may be from 7 to 13 cm, e.g. from 8 to 10 cm.

The two attachment means facilitates the folding of the bottom mattress section 103 into two overlying air compartments and the bottom mattress section 103 is preferably folded at least a length corresponding to the distance between the two attachment means. Depending on the length of the patient, the "folding distance" of the bottom mattress section may be larger. Typically, the folds of the knees of a patient serve as the guideline as to where the folding line should be.

During lifting, the lower lifting straps 109 and 111 enclose the air in the lowermost compartment and prevents it from slipping out. Thereby, an improved cushioning effect is achieved by means of the air compartments formed in the bottom mattress section 103.

The lower lifting straps 109, 111 may be arranged at a distance, d2, from the interface 113 between the main mattress section 101 and the bottom mattress section 103, wherein the distance, d2, is larger than the distance d1.

The distance, d2, may be at least 12 cm. For example, the distance, d2 may be from 12 to 35 cm. In embodiments, where the lifting strap(s) comprises two attachment means, the distance, d2, is measured from the center point of two neighbouring attachment means.

This arrangement enables folding of the bottom mattress section 103 while still keeping part of the bottom mattress section 103 substantially unfolded.

Figure 1B:
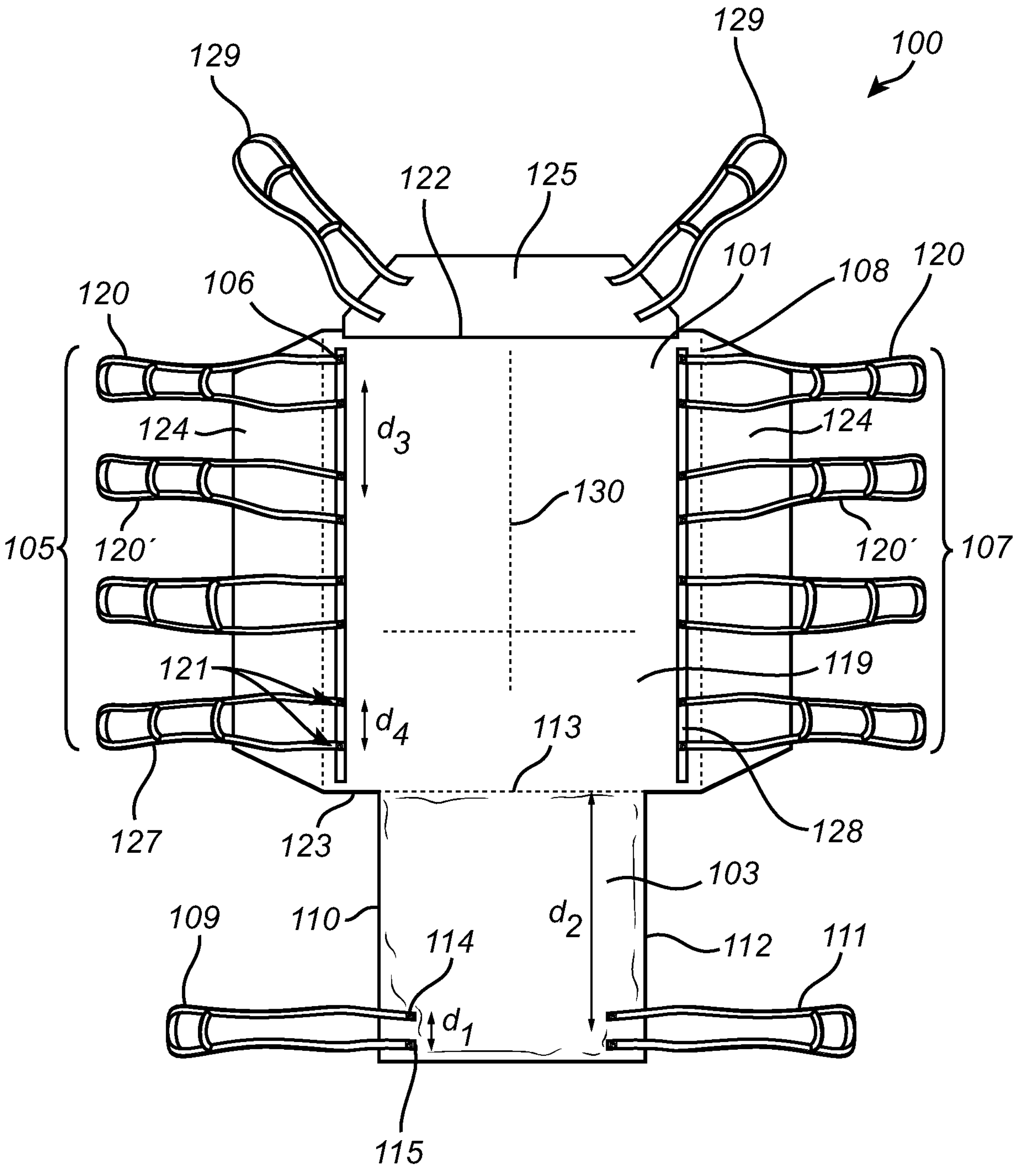
FIG. 1*b* illustrates a patient transfer mattress according to one embodiment of the present disclosure, seen from the bottom of the mattress.

The first and second sets of lifting straps 105, 107 preferably comprise at least three lifting straps 120. As illustrated in FIGS. 1*a* and 1*b*, four lifting straps 120 are arranged on each lateral edge 106, 108 of the main mattress section 101. Four lifting straps are preferred for an even distribution of load during lifting.

Each of the lifting straps 120 may include a strap portion that forms one or several gripping loops 127 in the lifting strap 120. The gripping loops are used to secure the lifting straps to a lifting device. This allows for flexibility in terms of the length of the straps when attaching to a lifting device, and particularly allows the mattress to be used to support a patient in a generally seated position.

The lifting straps 120 may be configured to be attached to a variety of different lifting devices. The lifting straps may or may not be all of the same length. The lifting straps may be configured to engage with a lifting device so that the patient is lifted in supine position. Preferably, the lifting straps are configured to engage with a lifting device so that the patient is lifted in a seated position.

The lifting straps 120 may have a length of from 30 to 50 cm. The lifting straps may also be adjustable in length.

As illustrated in FIG. 1, the lifting straps 120 extend perpendicular to the lateral edges 106, 108 of the main mattress section 101.

The lifting straps 120 of the main mattress section 101 are arranged such that the distance, d3, between a first lifting strap 120 and a neighbouring lifting strap 120' is from 8 to 20 cm, such as from 10 to 16 cm.

The distance, d3, between the lifting straps should not be too large as this may yield undesired pressure points for a patient being lifted, particularly if the patient is heavy or obese. Preferably, the distance, d3, between the lifting straps 120 does not exceed 20 cm to obtain an even distribution of load. The distance, d3, is measured from the center point of two neighbouring lifting straps 120.

Each of the lifting straps 120 of the first 105 and the second 107 sets of lifting straps may comprise at least two attachment means 121. This further improves the load distribution of a patient being lifted and prevents "protruding" body parts from falling out in the areas between the lifting straps.

The attachment means 121 are similar to the attachment means 114, 115, for the lower lifting straps and may be secured to the mattress by any mode of attachment such as stitching, welding etc.

In embodiments, additional handles may be secured between the attachment means 121 of the lifting straps 120. The handles may be located on the underside of the mattress 100, illustrated by 128 in FIG. 1*b*. The handles 128 may serve to move and reposition the mattress 100 and the patient. The handles 128 may be formed from bands extending between the attachment points. This offers the caregivers a variety of options for gripping locations when moving a patient.

To optimize the load distribution and prevent pressure peaks, the distance, d4, between each attachment means 121 of the lifting straps 120, 120' of the main mattress section 101 is substantially equal along the length of the lateral edges 106, 108 of the main mattress section 101. Preferably, the distance, d4 is from 8 to 18 cm, e.g. from 10 to 14 cm.

As illustrated in FIG. 1, the mattress 100 comprises two side mattress sections 124; each side mattress section 124 extending from each lateral edge 106, 108 of the main mattress section 101.

The side mattress section 124 may extend at an angle of 30 to 60 degrees from the main mattress section 101 in order not to completely enclose and "bury" the patient.

The main mattress section 101 has a first longitudinal edge 122 and a second longitudinal edge 123; the bottom mattress section 103 extending from the second longitudinal edge 123, and wherein the mattress 100 comprises a head mattress section 125 extending from the first longitudinal edge 122 of the main mattress section 101.

The head mattress section 125 may be sized and shaped so as to extend across a patient's upper torso at least from shoulder to shoulder and from the base of the spine to the top of the head. Alternatively, the head mattress section 125 covers the neck and the head of the patient only.

The head mattress section 125 provides support for the head of the patient during lifting. The head mattress section may or may not be formed integral with the main mattress section 101. It may be formed from the same material as the main mattress section 101, or from a different material, such as a material that provides comfort to the head during lifting.

Lifting straps 129 may be provided on the head mattress section 125.

As illustrated in FIG. 1*a*, the first 102 and the second 104 sealed compartments of air are configured to overlap in an area of the main mattress section 101.

The main mattress section 101 may comprise an upper portion 116 and a lower portion 117, wherein the first compartment of air 102 and the second compartment of air 104 are arranged to overlap at least in an area of the lower portion 117 of the main mattress section 101.

As used herein, the term "upper portion of the main mattress section" means a portion of the main mattress section corresponding to 50% of the extension of the main mattress section in the longitudinal (y) direction, extending from the first longitudinal edge 122 to a center point of the main mattress 101.

Accordingly, the term "lower portion of the main mattress section" means a portion of the main mattress section corresponding to 50% of the extension of the main mattress section in the longitudinal (y) direction, extending from the second longitudinal edge 123 to a center point of the main mattress 101.

The dotted lines in FIG. 1*a* illustrates the area of overlap between the first 102 and second 104 air compartments.

The overlapping air compartments 102 and 104 are preferably arranged in an area of the mattress 100 intended to be placed slightly below the sacrum area of the patient. When the patient is lifted, this has an offloading effect on the sacrum, which is an area of particular concern for pressure ulcer prevention. By supporting and lifting the upper thighs, a rotation of the pelvis is generated, which creates a changed angle of the coccyx bone. The sacrum is offloaded both due to the bolstering effect of the folded bottom mattress section 103 and due to the air compartment 102.

The offloading of pressure during lifting and the bolstering and cushioning effect provided by a mattress 100 of the present disclosure, makes the mattress useful not only for transferring a patient from one surface or bed to another, also for the purpose of providing an alternative position in a patient repositioning schedule.

In embodiments, the size of the first sealed air compartment 102 corresponds to at least 70% of the size of the main mattress section 101.

The lateral (x) extension of the first sealed air compartment 102 in the lower portion 117 of the main mattress section 101 may be smaller than the lateral (x) extension of the upper portion 116 of the main mattress section 101, as illustrated in FIG. 1*a*.

This configuration allows for advantages both when the patient is lying down, and is being lifted. The configuration allows the air to be pushed in the direction of the back of the patient, which enhances the bolstering effect of the lower back, the sacrum as well as the thighs of the patient. Air fills up the voids between the body and the mattress, which generates a more even support and contact over the patient body. An improved pressure redistribution effect is thereby achieved, since an even pressure over a larger surface area is generated.

In embodiments, the first compartment of air 102 and the second compartment of air 104 are unattached to each other.

In embodiments, the mattress 100 comprises a top layer 118 and a bottom layer 119, wherein the first compartment of air 102 is attached to the top layer 118 and the second compartment of air 104 is attached to the bottom layer 119.

As used herein the term "top layer" means the layer in contact with the patient during use. The top layer may be formed by one single layer covering all sections of the mattress, or it may comprise several layers sewn or sealed together. For example, the bottom mattress section may comprise a top layer being different from the top layer of the side or head mattress section.

The top layer 118 may be formed from a variety of materials and may also include multiple layers. The top layer 118 may comprise a softer material providing comfort to the patient. The top layer 118 may be formed from a material having a higher coefficient of friction than the bottom layer 119 in order to inhibit undesired slipping of the patient during lifting. For example, the top layer 118 may be comprise e.g. cotton, microfiber or other textiles.

The bottom layer 119 may be formed from a material having a low friction to facilitate sliding of the mattress 100 on a bed or support surface. The bottom layer 119 may for example be formed from a synthetic material, such as plastic, vinyl or the like.

The term "low friction" is a relative term that refers to the relative frictional forces generated when two surfaces are tested under similar conditions.

During manufacture of the mattress of the present disclosure, the first compartment of air 102 may first be attached to the top layer 118; i.e. sewn or sealed to an underside of the top layer (facing the interior of the mattress). The second compartment of air 104 may subsequently be attached to the bottom layer 119 of the mattress. Thereafter, the top layer 118 and the bottom layer 119 may be attached to each other, e.g. by sewing or sealing the outermost edges of the mattress 100. This way the air compartments 102 and 104 will partially overlap, but will remain unattached to each other.

As illustrated in FIG. 1*b*, the bottom layer 119 of the mattress 100 may comprise markings 130 to guide a caregiver to correctly position the patient on a hospital bed after the patient has been lifted, and is to be positioned on a bed or support surface.

If a hospital bed with an adjustable "head section" is utilized, the horizontally extending line of the mattress markings 130 is preferably arranged at the position of the bed, where the bend of the bed is located. This facilitates a correct positioning of a patient of the bed when a patient has been lifted and is to be re-positioned on the hospital bed (see FIG. 2*d*).

Markings may also be provided on the top layer 118 of the mattress. For example, such markings may be arranged to guide a caregiver on how to correctly position the patient on the mattress, both for the purposes of lifting the patient correctly, but also for the purpose of yielding an optimal pressure off-loading effect when a patient is lying down.

According to another aspect, the present disclosure relates to a method for lifting and/or transferring a patient.

With reference to FIG. 2*a-c*, the method comprises a) providing a patient transfer mattress 200 having a lateral (x) and a longitudinal (y) extension and comprising a main mattress section 201 and a bottom mattress section 203; the bottom mattress section 203 having a smaller lateral (x) extension than the main mattress section 201, wherein the main mattress section 201 comprises a first set of lifting straps 205 arranged along a first lateral edge of the main mattress section 201 and a second set of lifting straps 207 arranged opposite of the first set of lifting straps 205 along a second lateral edge of the main mattress section 201, wherein the bottom mattress section 203 comprises at least one first lower lifting strap 209 arranged on a first lateral edge of the bottom mattress section 203 opposite of at least a second lower lifting strap 211 arranged on a second lateral edge (not shown) of the bottom mattress section 203; wherein the bottom mattress section 203 comprises a sealed compartment of air, b) positioning a patient 231 on the mattress 200 such that the sealed compartment of air of the bottom mattress section 203 is arranged to cover the thighs of the patient 231 c) connecting the lifting straps 205, 207, 209 and 211 to a patient lift system 233 d) lifting and/or transferring the patient 231.

As illustrated in FIG. 2, the method comprises folding of the bottom mattress section 203 such that the sealed compartment of air 204 forms at least two overlying air compartments 232 (see the partial view in FIG. 2*b* illustrating the folding of the bottom mattress section)

The lift system 233 may be arranged over the patient 231 prior to lifting. Each of the lifting straps is engaged with the patient lift system 233. Gripping loops may be used to engage the mattress 200 with the lift 233. Depending on the size of the patient to be lifted, and on the position of the patient 233 during lifting, the gripping loops provides for a situation and patient adapted lifting.

After the lifting straps have been arranged on the lift 233, the lift 233 may be activated and the patient 231 may be lifted from the bed 234 and raised to the position as illustrated in FIG. 2*a.*

In step b), the bottom mattress section 203 may be folded along a folding line which corresponds to the lower thighs and/or the folds of the knees 235 of the patient 231.

As best illustrated in FIG. 2*c*, a bolstering and cushioning effect is achieved in the area of the lower thighs and the folds of the knees 235.

In another aspect of the present disclosure, the method as described hereinbefore constitutes a step in a patient repositioning and/or turning schedule.

Thus, there is provided a method for repositioning a patient comprising at least one step of lifting a patient with a mattress as described hereinabove or comprising a method for lifting a patient as described hereinabove.

The transfer mattress of the present disclosure may be used as a pressure off-loading mattress for a patient in both a lying and a lifting configuration. In other words, after the patient has been lifted or transferred, there is no need to replace the mattress of the present disclosure with another, different pressure off-loading mattress.

The lifting configuration of the mattress of the present disclosure has a pressure off-loading effect on the patient. A patient at risk of developing pressure ulcers must be repositioned and turned at regular intervals and such repositioning, and turning schedules are frequently utilized in care facilities and hospitals. The method described could form a step within such a repositioning schedule.

Figure 2D:
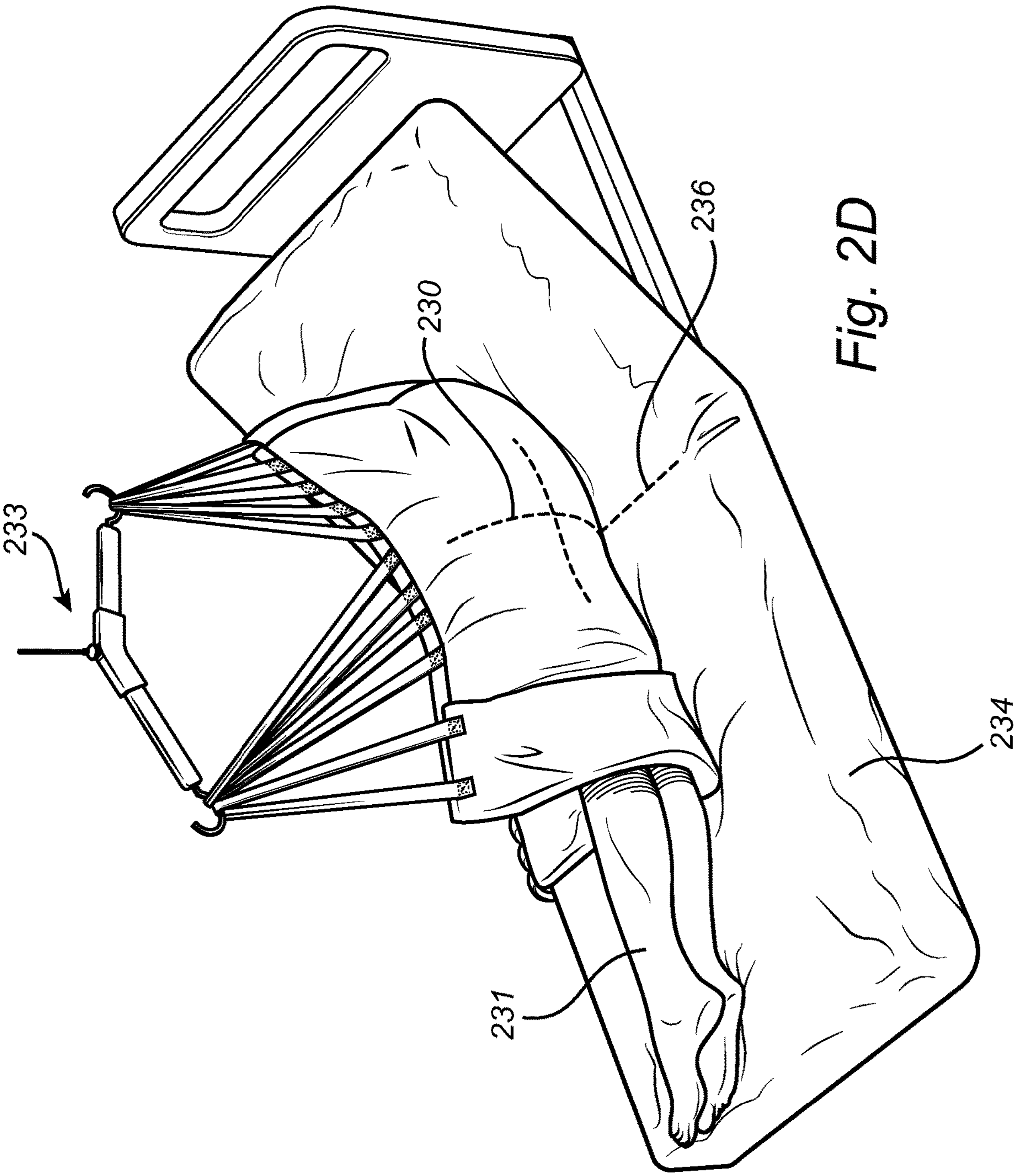
FIG. 2*d* illustrates a repositioned patient, wherein the markings of the bottom layer of the patient transfer mattress are illustrated.

FIG. 2*d* illustrates a patient 231 that has been repositioned (but not lifted). The patient 231 is lying sideways on the bed 234. The dotted lines 236 of the bed 234 illustrate the “bend” of the bed; i.e. where the head of the bed can be elevated. After a patient has been lifted (as illustrated in FIG. 2*a*) and the patient is to be repositioned in bed, the markings 230 of the bottom layer of the mattress 200 serve to guide the caregivers to correctly position the patient on the bed (i.e. corresponding to the bend 236 of the bed 234 where the head section can be elevated).

It should be noted that terms, definitions and embodiments of the first aspect of the present disclosure apply mutatis mutandis to the other aspects of the present disclosure, and vice versa.

Example 1: Evaluation of the Pressure Distribution Effect

To evaluate the effect of a patient transfer mattress according to the present disclosure, three separate patient transfer mattresses were evaluated.

Mattress A was a transfer mattress according to the present disclosure as defined in claim 1, and illustrated in FIG. 1. Mattress A comprised a top layer, a bottom layer and two respective sealed compartments of air; i.e. a first sealed compartment of air comprised in the main mattress section and a second sealed compartment of air comprised in the bottom mattress section, as illustrated in FIG. 1*a.*

Mattress B was a transfer mattress with the same construction as Mattress A, but differed with respect to the presence of air. No air was present in the bottom mattress section or in any other portion of the mattress.

Mattress C was a commercially available transfer sheet, Solo RepoSheet®, from Hill-Rom.

The mattresses were tested to evaluate the interface pressure and surface area subject to pressure above different critical thresholds when a subject has been suspended.

Three different test subjects were included in the tests:

TABLE 1

| Subjects tested | | | | |
|---|---|---|---|---|
| | Height (cm) | Weight (kg) | BMI | Gender |
| Subject 1 | 168 | 55 | 19.5 | Female |
| Subject 2 | 175 | 75 | 24.5 | Female |
| Subject 3 | 166 | 80 | 29 | Female |
| Average | 170 ± 5 | 70 ± 13 | 24 ± 5 | Female |

Test Set-Up

The mattresses (A-C) and the subjects were attached to a lift (VEGA505EE) provided with a bar from Handicare (Slingbar L). The test duration was five minutes. A pressure mat (XSensor LX100:40:40.02) was used to register the interface pressure during the entire test period. The pressure mat was arranged to register the interface pressure in an area covering the sacrum and the thighs (covering the thighs all the way to the knee folds).

First, the subject was in a flat supine position on a bed (Enterprise 500), then the bed was raised such that the head-of-bed (HOB) angle was 30 degrees, and the knees were bended as well. The subject was then lifted until totally suspended; i.e. freely hanging in the air. The test was repeated three times, one test for each mattress; i.e. the total test time for each subject was 20 minutes. Data was recorded directly from the pressure mat and the calibration of the pressure mat was controlled. The pressure data extracted from the pressure mat was made after the patient had been suspended for about one minute.

Pressure Re-Distribution Effect: Surface Area Evaluation

The pressure redistribution effect of the mattresses was evaluated by the pressure mat registration of the surface area ($cm^2$) above a pressure threshold of 40 mm Hg, and, of 60 mm Hg, respectively.

FIG. 3 illustrates the surface area for pressures above 40 mm Hg for three subjects for Mattress A, and Mattress B, respectively. As illustrated in this figure, Mattress A yields a significantly smaller area of higher pressures than Mattress B.

FIG. 4 illustrates the pressure mat recordings of 5-80 mm Hg for subject 2 when lifted with Mattress A (FIG. 4*a*) and Mattress B (FIG. 4*b*). The darker sections in this figure illustrate the areas of the subject exposed to higher amounts of pressure. As can be seen, the areas exposed to the highest amounts of pressure are the knee folds, and the sacral buttocks.

Figure 5:
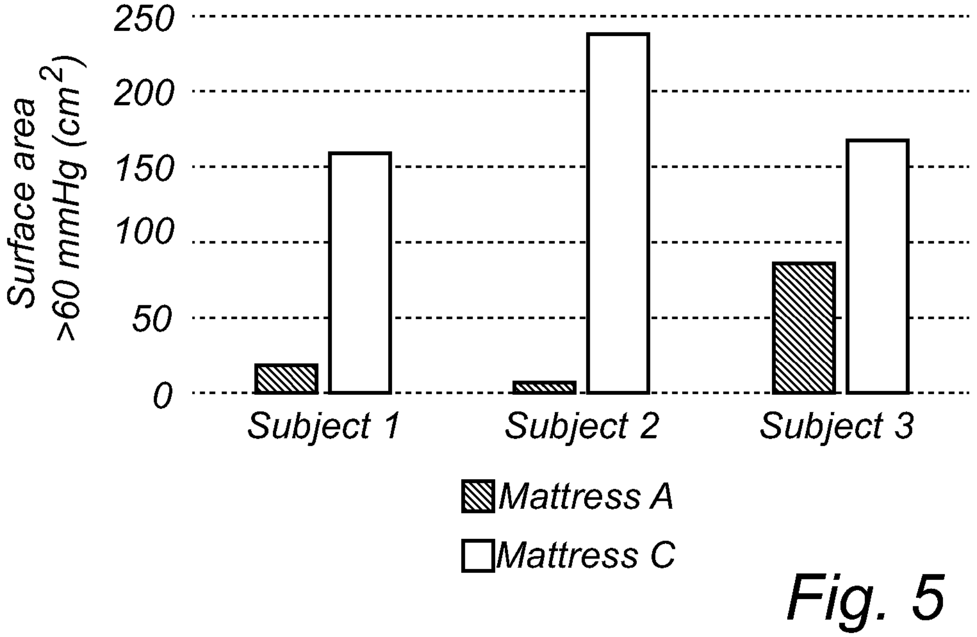
FIG. 5 illustrates the surface area for pressures above 60 mm Hg for a mattress according to the present disclosure compared to a competitor mattress (Mattress C).

FIG. 5 illustrates the surface area for pressures above 60 mm Hg for Mattress A, and Mattress C, respectively. As illustrated in this figure, Mattress C yields a significantly higher surface area of high pressures for all subjects compared to Mattress A.

Figure 6:
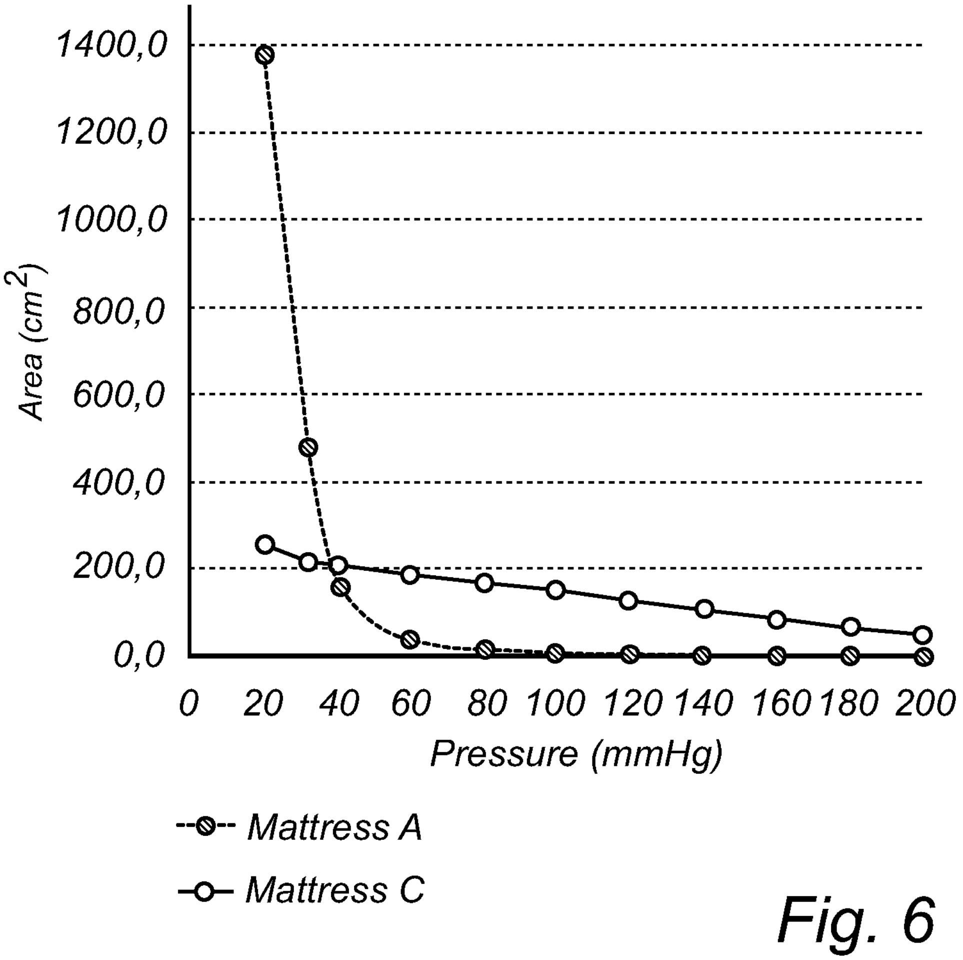
FIG. 6 illustrates the average surface area above pressure thresholds up to 200 mm Hg for a mattress according to the present disclosure compared to a competitor mattress (Mattress C).

In addition to FIG. 5 that illustrates surface area for pressure above 60 mmHg, the average surface area above pressure thresholds up to 200 mm Hg was evaluated, and is illustrated in FIG. 6. As can be seen, Mattress C has a large surface with stresses all the way up to 200 mm Hg. In contrast, the surface area recorded for Mattress A was small for pressures above 60 mm Hg. This is due to the pressure offloading effect of Mattress A, i.e. the ability of the mattress to distribute the body load more evenly over the entire mattress surface. With a larger surface area that evenly supports the body, the body load per area unit, i.e. pressure, will be smaller and less harmful. In FIG. 6 the large area with lower pressure (<40 mm Hg) for Mattress A illustrates this.

To summarize, these results illustrate that even during short durations of lifts, the patient may be exposed to high pressures which eventually may lead to the formation of pressure ulcers. This is demonstrated by the surface area recordings of Mattress B, and C, respectively. However, when a mattress according to the present invention is used (Mattress A) for lifting a subject, an enhanced pressure redistribution and pressure offloading effect is achieved.

Example 2: Evaluation of Critical Stresses in the Soft Tissue by FE Modelling

Finite Element (FE) Modelling

The mechanisms leading to pressure ulcers are not fully understood. Pressure sensing mats can give information on pressure present at the mattress under the skin surface but does not inform on the behavior inside the soft tissues. An increased stress and/or strain in the soft tissue can generate increased discomfort, or even pain. Therefore, the Finite Element (FE) method offers a great alternative to study deep tissue response.

The FE method is a numerical and computational technique used to solve multiphysics problems by solving partial differential equations upon different types of discretizations. The FE method subdivides a large problem or large 3D model into smaller parts, called finite elements. The analyses are performed within each element, and the assembly gives a solution to the entire problem.

The workflow for a FE analysis can be explained as follows: creation of a 3D model constituted of finite elements, definition of the material properties of the model, definition of the boundary conditions and loadings to apply to the model according to the problem, computational solving of the problem, and analysis of the results through visualization and calculations.

Finite Element (FE) Settings and Anatomical Model

In order to understand the effect of the patient transfer mattress according to the present invention, finite Element (FE) models of a full body model and of a patient transfer mattress according to the present disclosure were created, and analyses were performed to study the effect of pressure and stresses in the deep tissue layers. The volunteer was a non-smoker healthy adult male of 31 years at the time of the study (length: 177 cm, weight: 85 kg).

The FE models were prepared in prepared in ANSA 19.1.1 and META 19.1.1 (BETA CAE) and the analysis performed in ABAQUS 2019x (DASSAULT SYSTEM). The human body model was based on segmentation from MRI data from the Virtual Population 3.0.

The soft tissues were represented as non-linear materials. The muscles were lumped together as one material, the fat and the skin were lumped together as one compressive material, tensile properties of the skin were represented with a shell, the bones as rigid body. The main joints (i.e. two knee joints, two hip joints and one neck/skull joint) were modelled to enable a realistic movement of a human body. The spine was modelled with intervertebral discs.

The deformation of the soft tissue caused by compression from the body weight was used to validate the material properties in the FE model with ABAQUS 14.0 (DASSAULT SYSTEM). The validation was carried out by comparing the thickness of the soft tissues before and after compression between the model and the MRI data.

The evaluation of the soft tissue was performed by first simulating a clinical setting where a patient is lying on a mattress. A soft mattress (30 kPa) was added under the pelvis and the equivalent of the body weight was applied to induce contact and compression of the pelvis on the mattress. Next, the evaluation of the body position was performed by comparing the body position of a healthy subject hanging in the patient transfer mattress with the body position in the FE model when simulating the patient hanging in a patient transfer mattress according to the present disclosure.

Patient mattresses A and B (as described in Example 1) were used in the experiments. Accordingly, Mattress A represented a patient transfer mattress according to the present disclosure. Mattress A comprised a top layer, a bottom layer and two respective sealed compartments of air; i.e. a first sealed compartment of air comprised in the main mattress section and a second sealed compartment of air comprised in the bottom mattress section, as illustrated in FIG. 1*a*. Each sealed air compartment was modeled as a single fluid cavity with holes. Mattress B had the same construction and same shape as Mattress A, but did not comprise any air comprised within the sealed (air) compartments. This patient mattress corresponds to a prior art mattress. The distribution of the lifting straps were the same for both mattresses (corresponding to the illustration in FIGS. 1*a* and 1*b*).

Both mattresses A and B were simulated with the second sealed compartment in a folded configuration during lifting of the patient; i.e. the folded compartment was the edge of the mattress and positioned just above the knee fold of a patient.

The movement of the straps was made in two steps. First, two pairs of top straps were moved to a hanger bar positioned 530 mm from the bed surface in the level of the navel area. This was done to straighten it up in a more seated position. Second, the remaining four pairs of straps were moved to the hanger bar.

The results hereinbelow show different stresses for the last stage in the FE simulation; i.e. in the lifting configuration when the body is hanging in the air. These results were observed on all the soft tissue layers together. Table 2 below presents the stresses evaluated.

To calculate the volume of tissue under stress, all tissue elements of certain tissue volume were observed. After deciding the range of critical stresses, it was possible to isolate the elements which were above that critical stress and then compare the results for Mattress A, and Mattress B, respectively. The volume calculation was based on stresses in each element. The following stresses were investigated:

TABLE 2

Soft tissue and simulated stresses

| Soft tissue layer | Definition of surfaces observed | Stresses investigated (in lifting configuration) |
|---|---|---|
| Soft tissue | Skin, fat and muscle | Von Mises stresses (VMS)<br>Shear stresses (XY, XZ, YZ) |

The "Von Mises stresses", VMS (MPa) origin from the von Mises criterion, also known as the maximum distortion strain energy criterion. It is a quantitative criterion widely used in engineering. A stress measure that takes into account all stresses experienced by a continuum element. The Strain Energy Density is separated into different components in order to isolate the hydrostatic stresses and the deviatoric stresses. The deviatoric stresses are represented by the VMS, and combine stresses in different directions into an equivalent stress that will take into account normal stresses, shear stresses and distortion.

The Von Mises Stresses (VMS) are defined in the Distorsion Energy Theory and represent a common criterion widely used in engineering. The VMS can be defined as:

$$\sigma_{VM}=\sqrt{½[(\sigma_{xx}-\sigma_{yy})^2+(\sigma_{yy-\sigma zz})^2+(\sigma_{zz}-\sigma_{xx})^1]+3(\tau_{xy}{}^2+\tau_{yz}{}^2+\tau_{zx}{}^2)}$$

"Shear stresses" in different planes (MPa) cause deformation of a material by slippage along a plane or planes parallel to the imposed stress. It arises from the shear force, the component of force vector parallel to the material cross section. The reason for introducing them as a measure is an experienced feeling of shearing in soft tissues in contact with the mattress edge during hanging/lifting in the mattress.

Shear stresses are stresses parallel to the plane and can be expressed as:

$$\tau=F_p/A, \text{ wherein}$$

$\tau$=shear stress (MPa)

$F_p$=parallel component force (N)

A=area (mm$^2$)

There are no known values of critical stresses, as it varies between individuals, due to their physiological parameters, health, age and with the duration of exposure to the stresses. Therefore, the evaluation of the effect of the mattresses relies on qualitative values.

The critical value of stresses correspond to about 1 kg for 10 cm$^2$ (around 10 kPa), except for the shear stresses, where a lower value of the critical stresses was used, corresponding to about 100 g for 10 cm$^2$ (around 1 kPa), as the stresses are applied parallel to the muscle fibers and therefore against a more natural compressive behavior.

Results

Figure 7:
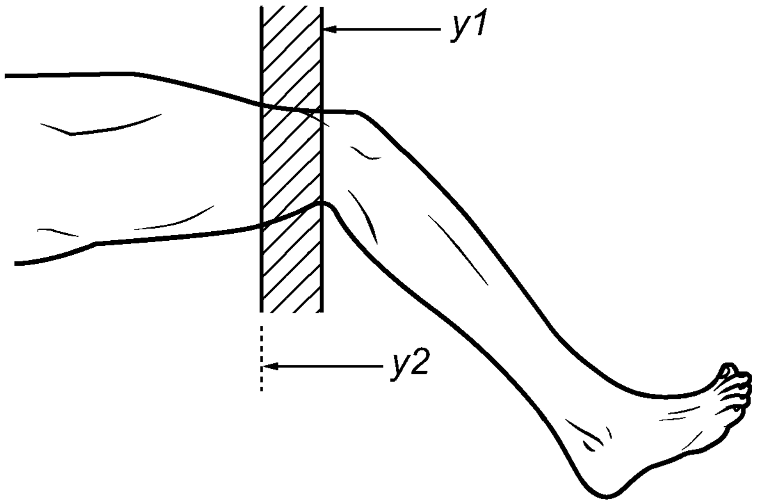
FIG. 7 illustrates the area investigated with FE modelling to calculate the volume of critical stresses when using a mattress according to the present disclosure (Mattress A) and a comparative mattress (Mattress B).
Figure 8:
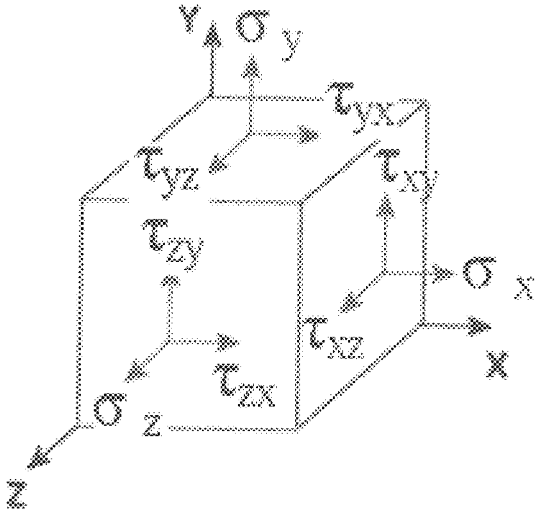
FIG. 8 illustrates the stress components in the Von Mises Stress equation.

The patient transfer mattresses A and B were evaluated by their ability to reduce stresses in soft tissue. The performance of the mattresses was evaluated by their ability to reduce the volume of tissue under critical stresses. The performances of the mattress of the present disclosure; i.e. Mattress A would therefore be defined as the percentage reduction of volume of tissue under critical stress when compared to the product without air; i.e. Mattress B:

$$\text{Reduction } (\%)=((V_{no\ air}-V_{air})/V_{no\ air})\times 100, \text{ wherein}$$

the reduction (%)=percentage reduction of volume of tissue under critical stress, $V_{no\ air}$=volume of tissue under critical stress in Mattress B $V_{air}$=volume of tissue under critical stress in Mattress A FIG. 7 illustrates the volume for critical stress evaluation, defined by two cross sections, y1 and y2. Both mattresses were investigated in the same volume of tissue; i.e. in the area just above the knee fold. The area measured is referred to as the "knee fold region" in table 3 below, although the evaluation is actually performed in the region just above the knee fold, where the edge of the mattresses is arranged. For both mattresses, measurements were made with y1=575 mm and y2=650 mm.

Next, a larger area, covering also the thighs of the patient (from the knees to the hips), was analyzed. In this evaluation, y1 was 575 mm and y2 was 925 mm for both mattresses. The area measured is referred to as "the thigh region" in table 3 below.

Table 3 below illustrates the volume of soft tissue under critical VMS stresses; i.e. the volume that exceeds the 0.01 MPa threshold, and the percentage of improvement in stress reduction by Mattress A.

TABLE 3

Volume of soft tissue with critical Von Mises stresses in knee fold and thigh regions

| | Mattress A | Mattress B | Improvement by Mattress A |
|---|---|---|---|
| Volume of soft tissue elements under critical stresses in knee fold region (mm3) | 7250 | 36404 | 80% |
| Volume of soft tissue elements under critical stresses in thigh region (mm3) | 39524 | 46886 | 16% |

Next, the volume of elements under critical shear stresses in the soft tissue was compared between Mattress A and Mattress B. The area above the knee fold was investigated (i.e. y1 was 575 mm and y2 was 650 mm for both mattresses). The volume of elements that exceeds the critical shear stresses (±0.001 MPa) threshold was investigated in three different planes; i.e. the XY plane, the XZ plane, and the YZ plane. The results are shown in table 4 below.

TABLE 4

Volume of soft tissue elements under critical shear stresses

| | Mattress A | Mattress B | Improvement by Mattress A |
|---|---|---|---|
| Volume of soft tissue elements under critical XY shear stresses (mm3) | 9264 | 44867 | 79% |
| Volume of soft tissue elements under critical XZ shear stresses (mm3) | 39983 | 88259 | 55% |
| Volume of soft tissue elements under critical YZ shear stresses (mm3) | 28578 | 55155 | 48% |
| Total volume of soft tissue elements under critical shear stresses (mm3) | 77825 | 188281 | 59% |

As demonstrated in tables 3 and 4, a mattress according to the present disclosure significantly reduces critical Von Mises stresses and shear stresses in the soft tissue. This is particularly the case in the area just above the knee fold, which is regarded as a critical area for the creation of harmful pressure points during lifting.

In addition, the results from the FE modelling indicated that the simulated body laying on Mattress A had a contact area of 240350 mm2. The corresponding area for Mattress B was 197366 mm2. This represents an increase in 22%. These results indicate that Mattress A yields an improved weight distribution, and can also relieve the sacral buttocks to a greater extent.

Even though the present disclosure has been described with reference to specific exemplifying embodiments thereof, many different alterations, modifications and the like will become apparent for those skilled in the art.

Variations to the disclosed embodiments can be understood and effected by the skilled addressee in practicing the present disclosure, from a study of the drawings, the disclosure, and the appended claims. Furthermore, in the claims, the word "comprising" does not exclude other elements or steps, and the indefinite article "a" or "an" does not exclude a plurality.

The invention claimed is:

1. A patient transfer mattress having a lateral (x) and a longitudinal (y) extension, wherein said mattress is configured to be arranged in each of a resting configuration and a lifting configuration; said mattress comprising a main mattress section and a bottom mattress section; said bottom mattress section having a smaller lateral (x) extension than said main mattress section, wherein said main mattress section comprises a first set of lifting straps arranged along a first lateral edge of said main mattress section and a second set of lifting straps arranged opposite of said first set of lifting straps along a second lateral edge of said main mattress section, wherein said bottom mattress section comprises at least one first lower lifting strap arranged on a first lateral edge of said bottom mattress section opposite of at least one second lower lifting strap arranged on a second lateral edge of said bottom mattress section; said lifting straps being configured to be connected to a patient lifting device, wherein said main mattress section comprises a first sealed compartment of air, wherein said bottom mattress section comprises a second sealed compartment of air and is configured to cover thighs of a patient in said lifting configuration, said first and said second sealed compartments of air being configured to overlap in an area of said main mattress section, wherein said mattress comprises a top layer and a bottom layer, wherein said first compartment of air is attached to said top layer and said second compartment of air is attached to said bottom laver.

2. The patient transfer mattress according to claim 1, wherein the size of said sealed air compartment corresponds to at least 80%, a size of said bottom mattress section.

3. The patient transfer mattress according to claim 1, wherein an air filling degree of said sealed air compartment is from 20% to 70%.

4. The patient transfer mattress according to claim 1, wherein in said lifting configuration, said bottom mattress section is folded such that said sealed compartment of air forms at least two overlying air compartments.

5. The patient transfer mattress according to claim 1, wherein each of said lower lifting straps comprises at least a first and a second attachment means configured to attach said lifting straps to said bottom mattress section.

6. The patient mattress according to claim 5, wherein said first and said second attachment means are arranged at a distance, d1, from each other, wherein said distance, d1, corresponds to a minimum length by which said bottom mattress section is folded in said lifting configuration.

7. The patient transfer mattress according to claim 6, wherein said lower lifting straps are arranged at a distance, d2, from an interface between said main mattress section and said bottom mattress section, wherein said distance, d2, is larger than said distance d1.

8. The patient transfer mattress according to claim 1, wherein said first and second sets of lifting straps comprise at least three lifting straps.

9. The patient transfer mattress according to claim 1, wherein said lifting straps of said main mattress section are arranged such that a distance, d3, between a first lifting strap and a neighbouring lifting strap is from 8 to 20 cm.

10. The patient transfer mattress according to claim 1, wherein each of said lifting straps of said first and said second sets of lifting straps comprises at least two attachment means configured to attach said lifting straps to said main mattress section, wherein a distance, d4, between each attachment means is substantially equal along a length of said lateral edges of said main mattress section.

11. The patient transfer mattress according to claim 1, wherein said mattress comprises two side mattress sections; each side mattress section extending from each lateral edge of said main mattress section.

12. The patient transfer mattress according to claim 1, wherein said main mattress section has a first longitudinal edge and a second longitudinal edge; said bottom mattress section extending from said second longitudinal edge, and wherein said mattress comprises a head mattress section extending from said first longitudinal edge of said main mattress section.

13. The patient transfer mattress according to claim 1, wherein said first compartment of air and said second compartment of air are unattached to each other.

14. A method for lifting and/or transferring a patient comprising:

a) providing a patient transfer mattress having a lateral (x) and a longitudinal (y) extension and comprising a main mattress section, a bottom mattress section; said bottom mattress section having a smaller lateral extension than said main mattress section, wherein said main mattress section comprises a first set of lifting straps arranged along a first lateral edge of said main mattress section and a second set of lifting straps arranged opposite of said first set of lifting straps along a second lateral edge of said main mattress section, wherein said bottom mattress section comprises at least one first lower lifting strap arranged on a first lateral edge of said bottom mattress section opposite of at least a second lower lifting strap arranged on a second lateral edge of said bottom mattress section, wherein said main mattress section comprises a first sealed compartment of air, wherein said bottom mattress section comprises a second sealed compartment of air, said first and said second sealed compartments of air being configured to overlap in an area of said main mattress section, wherein said mattress comprises a top layer and a bottom layer, wherein said first compartment of air is attached to said top layer and said second compartment of air is attached to said bottom layer, and b) positioning a patient on said mattress such that the sealed compartment of air of the bottom mattress section is arranged to cover thighs of the patient, c) connecting said lifting straps to a patient lift system, and d) lifting and/or transferring said patient.

15. The method according to claim 14, comprising folding said bottom mattress section such that said sealed compartment of air of said bottom mattress section forms at least two overlying air compartments prior to connecting said lifting straps to said patient lift system.

16. The method for repositioning a patient comprising at least one step of repositioning a patient with a mattress according to claim 1.

* * * * *